D. Breuer.
Cotton Planter.
Nº 3,526.          Patented Apr. 4, 1844.
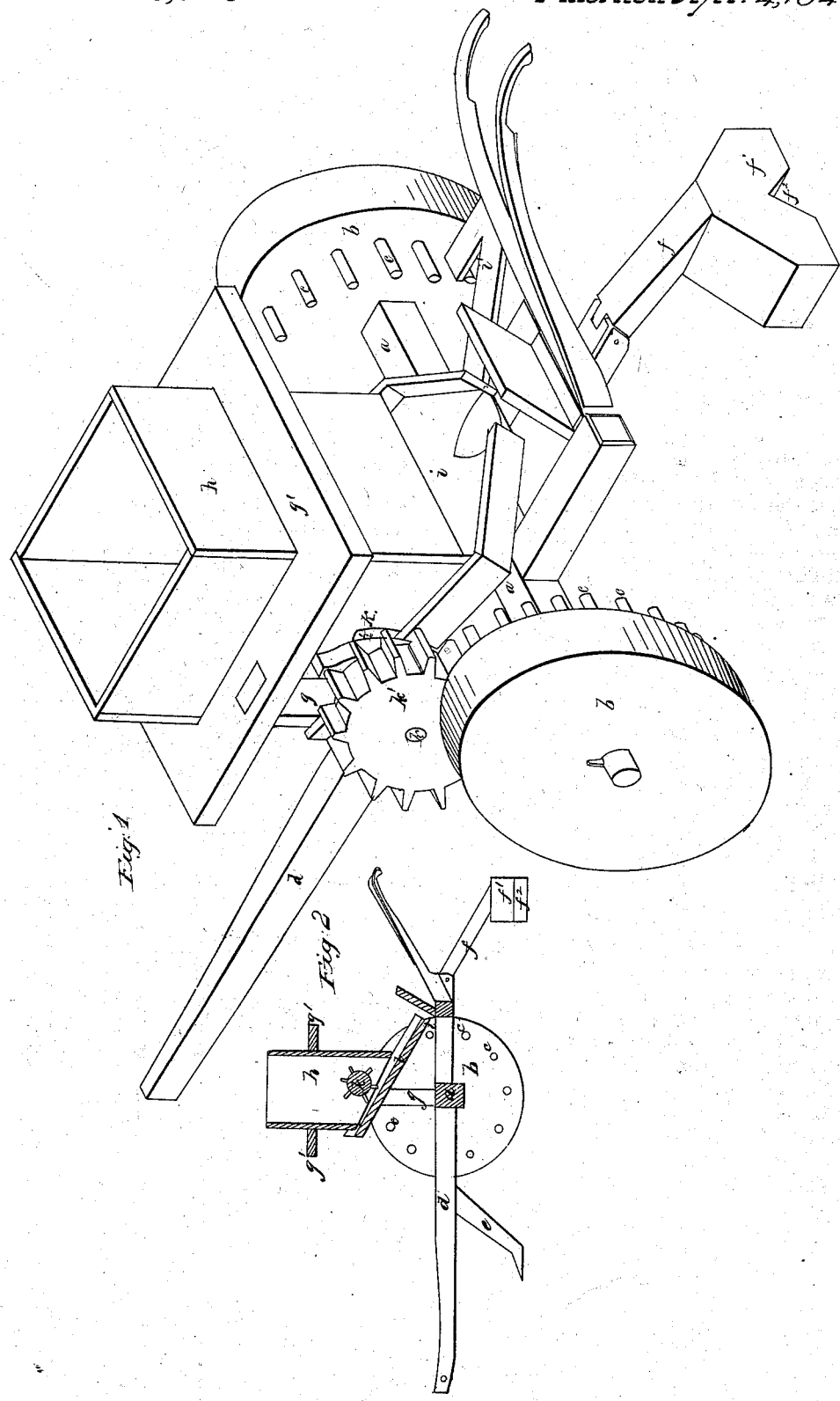

UNITED STATES PATENT OFFICE.

DIERCK BREUER, OF PETERSBURG, TENNESSEE.

IMPROVEMENT IN SEED-PLANTING MACHINES.

Specification forming part of Letters Patent No. 3,525, dated April 4, 1844.

*To all whom it may concern:*

Be it known that I, DIERCK BREUER, of Petersburg, in the county of Lincoln and State of Tennessee, have invented a new and useful Improvement in Planting Cotton-Seed; and I do hereby declare that the following is a full, clear, and exact description thereof, reference being had to the accompanying drawings, which form a part of this specification.

Figure 1 is a perspective view; Fig. 2, a vertical section.

The nature of my invention consists in the combination of a spiked roller and shaking shoe in the bottom of a hopper for separating the seed and distributing it.

The construction is as follows: On an axle, $a$, two wheels, $b$, are put, which turn independent of it. These wheels have cogs or pins $c$ projecting from their inner faces, near their periphery. From the axle a beam, $d$, projects in front, shaped somewhat like a plow-beam. To the under side of said beam a tooth, $e$, for opening the ground, is affixed. Two pieces extend out from the axle behind, which are united by a cross-piece at the outer ends. From said cross-piece a jointed beam, $f$, projects, which has a block, $f'$, attached to its lower end. The block has a triangular groove, $f^2$, cut across its under side from front to back, and somewhat enlarged at the front end. This is not shown on the drawings. The joint in the beam $f$ allows the block, which follows the ground, to move up and down. On the axle $a$ are erected two standards, $g$, which support a square frame, $g'$, horizontally at their top, in which the hopper $h$, for holding the seed, is placed. Under the hopper there is a shoe, $i$, inclining backward, so as to carry off the seed. Behind the shoe is suspended between the standards above named, and is shaken by means of an arm, $i'$, which extends out from it on one side, so as to be struck by the cogs on one of the wheels and thereby shaken. An axle or shaft, $k$, runs through the hopper from side to side, just over the shoe, and is supported in bearings in the standards. On one end of this shaft, outside, there is a pinion, $k'$, which works into the cogs on the wheel of the carriage above named. The shaft is armed inside the hopper with spikes, which stand out radially. By this arrangement the seeds are separated and distributed into the furrow which is opened by the plow, and it is covered with the drag or block $f'$ behind.

What I claim as my invention, and desire to secure by Letters Patent, is—

The combination of the axle $k$ and vibrating shoe $i$ with the seeding-machine, constructed and arranged in the manner and for the purpose herein described.

DIERCK BREUER.

Witnesses:
JAMES WILSON,
JAMES R. HESTER.